(12) United States Patent
Nishizaki et al.

(10) Patent No.: US 11,330,412 B2
(45) Date of Patent: May 10, 2022

(54) VEHICLE COMMUNICATION SYSTEM

(71) Applicant: Yazaki Corporation, Tokyo (JP)

(72) Inventors: Ryohei Nishizaki, Shizuoka (JP); Eita Itou, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/295,070

(22) Filed: Mar. 7, 2019

(65) Prior Publication Data
US 2019/0281429 A1   Sep. 12, 2019

(30) Foreign Application Priority Data

Mar. 12, 2018 (JP) .............................. JP2018-043875

(51) Int. Cl.
| | |
|---|---|
| *H04W 4/44* | (2018.01) |
| *G01S 5/00* | (2006.01) |
| *G01S 19/42* | (2010.01) |
| *G07C 5/00* | (2006.01) |
| *H04W 4/02* | (2018.01) |
| *H04W 64/00* | (2009.01) |
| *H04W 36/32* | (2009.01) |
| *H04W 36/24* | (2009.01) |
| *H04W 84/12* | (2009.01) |
| *H04W 36/36* | (2009.01) |

(52) U.S. Cl.
CPC ............. *H04W 4/44* (2018.02); *G01S 5/0027* (2013.01); *G01S 19/42* (2013.01); *G07C 5/008* (2013.01); *H04W 4/027* (2013.01); *H04W 36/32* (2013.01); *H04W 64/006* (2013.01); *H04W 36/245* (2013.01); *H04W 36/36* (2013.01); *H04W 84/12* (2013.01)

(58) Field of Classification Search
CPC ....... G01S 19/42; G01S 5/0027; G07C 5/008; H04W 36/245; H04W 36/32; H04W 36/36; H04W 4/027; H04W 4/44; H04W 64/006; H04W 84/12
USPC .......................................................... 370/329
See application file for complete search history.

(56) References Cited

U.S. PATENT DOCUMENTS

| | | | |
|---|---|---|---|
| 8,995,662 | B2 | 3/2015 | Rubin et al. |
| 2010/0069072 | A1 | 3/2010 | Gogic et al. |
| 2011/0319106 | A1* | 12/2011 | Lim ..................... H04B 7/2606 455/507 |

(Continued)

FOREIGN PATENT DOCUMENTS

| | | |
|---|---|---|
| CN | 106921939 A | 7/2017 |
| JP | 2002-27519 A | 1/2002 |

(Continued)

*Primary Examiner* — Kibrom T Hailu
*Assistant Examiner* — Nizam U Ahmed
(74) *Attorney, Agent, or Firm* — Kenealy Vaidya LLP

(57) ABSTRACT

A vehicle communication system includes an in-vehicle router. The in-vehicle router includes a Wi-Fi module, a GPS, a vehicle speed acquirer, and an in-vehicle CPU. The Wi-Fi module is a module mounted on a vehicle and provided connectable to an access point of a wireless LAN. The GPS acquires vehicle position information indicating the position of the vehicle. The vehicle speed acquirer acquires vehicle speed information indicating the speed of the vehicle. The in-vehicle CPU determines the access point to be connected to the Wi-Fi module based on the vehicle position information and the vehicle speed information.

12 Claims, 8 Drawing Sheets

(56) References Cited

U.S. PATENT DOCUMENTS

| | | | |
|---|---|---|---|
| 2012/0176254 A1 | 7/2012 | Imanaga et al. | |
| 2013/0100819 A1* | 4/2013 | Anchan | H04W 48/20 370/241 |
| 2013/0201316 A1* | 8/2013 | Binder | H04L 67/12 701/2 |
| 2015/0004975 A1* | 1/2015 | Yamamoto | H04W 36/24 455/436 |
| 2015/0245280 A1* | 8/2015 | Zhou | H04W 36/32 455/434 |
| 2016/0081003 A1* | 3/2016 | Ishihara | H04B 7/15507 370/338 |
| 2016/0165529 A1* | 6/2016 | Jin | H04W 48/20 370/338 |
| 2017/0086103 A1 | 3/2017 | Neves et al. | |
| 2017/0303190 A1* | 10/2017 | Koch | H04W 4/029 |
| 2018/0234904 A1* | 8/2018 | Lee | H04W 4/70 |
| 2018/0246185 A1* | 8/2018 | Hirayama | G01S 5/0072 |

FOREIGN PATENT DOCUMENTS

| | | |
|---|---|---|
| JP | 2005-341254 A | 12/2005 |
| JP | 2012-503439 A | 2/2012 |

\* cited by examiner

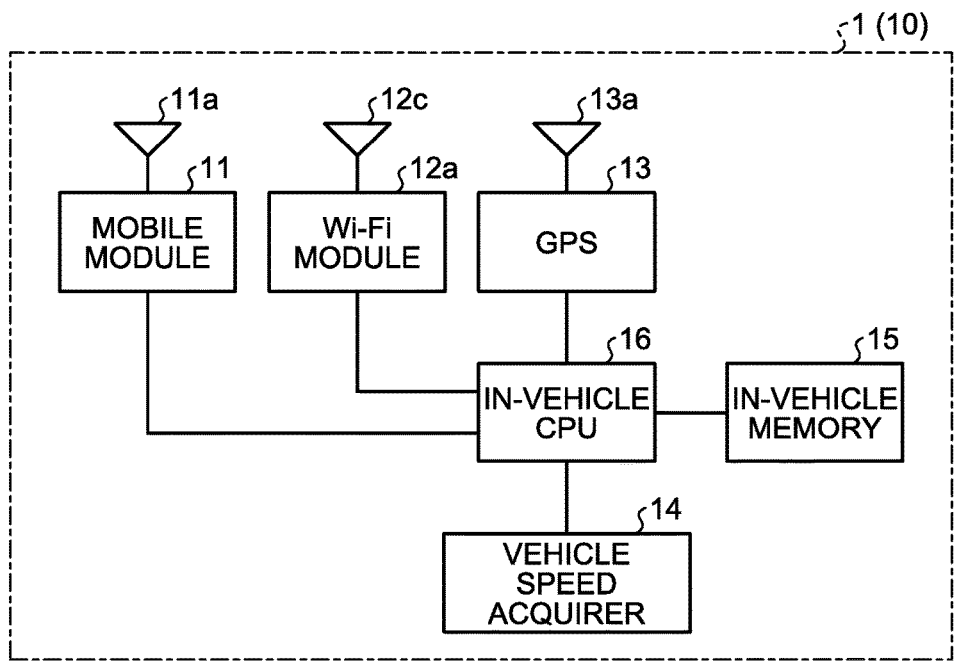

| | SSID | PASSWORD | POSI-TION | SECURITY METHOD | FREQUEN-CY (ch) | USAGE RATE |
|---|---|---|---|---|---|---|
| FIRST ACCESS POINT | ○○ | ×× | △△ | □□ | ◇◇ | ◎◎ |
| SECOND ACCESS POINT | ○○ | ×× | △△ | □□ | ◇◇ | ◎◎ |
| THIRD ACCESS POINT | ○○ | ×× | △△ | □□ | ◇◇ | ◎◎ |
| ⋮ | ⋮ | ⋮ | ⋮ | ⋮ | ⋮ | ⋮ |

VEHICLE COMMUNICATION SYSTEM

CROSS-REFERENCE TO RELATED APPLICATION(S)

The present application claims priority to and incorporates by reference the entire contents of Japanese Patent Application No. 2018-043875 filed in Japan on Mar. 12, 2018.

BACKGROUND OF THE INVENTION

1. Field of the Invention

The present invention relates to a vehicle communication system.

2. Description of the Related Art

Conventionally, Japanese Patent Application Laid-open No. 2005-341254 discloses, as a vehicle communication system, an in-vehicle wireless LAN connection terminal connected to a wireless LAN, for example. The in-vehicle wireless LAN connection terminal determines an access point targeted for connection based on a vehicle position and a vehicle traveling direction.

For example, the in-vehicle wireless LAN connection terminal described in Japanese Patent Application Laid-open No. 2005-341254 sometimes passes, in a vehicle traveling state, by a connectable region of the access point during authorization for the access point, and accordingly, is disconnected from an external communication network. On this point, there is room for further improvement.

SUMMARY OF THE INVENTION

For this reason, the present invention has been made in view of the above-described point, and is intended to provide a vehicle communication system allowing proper connection to an access point.

In order to solve the above mentioned problem and achieve the object, a vehicle communication system according to one aspect of the present invention includes a communication module mounted on a vehicle and connectable to an access point of a wireless LAN; a position acquirer configured to acquire vehicle position information indicating a position of the vehicle; a vehicle speed acquirer configured to acquire vehicle speed information indicating a speed of the vehicle; and an in-vehicle controller configured to determine the access point to be connected to the communication module based on the vehicle position information and the vehicle speed information.

According to another aspect of the present invention, in the vehicle communication system, it is preferable that the in-vehicle controller determines, as a subsequent connection destination, a first access point among multiple access points in a case where the speed in the vehicle speed information indicates a first speed, and determines, as the subsequent connection destination, a second access point farther from the vehicle than the first access point among the multiple access points in a case where the speed in the vehicle speed information indicates a second speed faster than the first speed.

According to still another aspect of the present invention, in the vehicle communication system, it is preferable that the communication module is able to acquire power information indicating a reception intensity of a radio wave received from the access point, and the in-vehicle controller determines the access point to be connected to the communication module based on the vehicle position information, the vehicle speed information, and the power information.

According to still another aspect of the present invention, in the vehicle communication system, it is preferable that the in-vehicle controller determines, as a subsequent connection destination, a first access point greatest in power in the power information among multiple access points in a case where the speed in the vehicle speed information indicates a first speed, and determines, as the subsequent connection destination, a second access point assumed farther from the vehicle than the first access point is and greatest in the power in the power information upon connection among the multiple access points in a case where the speed in the vehicle speed information indicates a second speed faster than the first speed.

According to still another aspect of the present invention, in the vehicle communication system, it is preferable that the vehicle communication system includes an in-vehicle storage mounted on the vehicle to store the access points, wherein the in-vehicle controller determines the access point to be subsequently connected among the access points stored in the in-vehicle storage.

According to still another aspect of the present invention, in the vehicle communication system, it is preferable that the vehicle communication system includes an external device provided outside the vehicle and including an external storage storing the access points, wherein the external device transmits the access points stored in the external storage to the in-vehicle controller, and the in-vehicle controller determines the access point to be subsequently connected among the access points transmitted from the external device.

According to still another aspect of the present invention, in the vehicle communication system, it is preferable that the vehicle communication system includes the external device provided as the device provided outside the vehicle and including the external storage storing the access points and an external controller configured to select the access point as a candidate, wherein the in-vehicle controller transmits the vehicle position information and the vehicle speed information to the external controller, based on the vehicle position information and the vehicle speed information transmitted from the in-vehicle controller, the external controller transmits, to the in-vehicle controller, a candidate access point as a candidate for subsequent connection among the access points stored in the external storage, and the in-vehicle controller determines, as the access point to be subsequently connected, the candidate access point transmitted from the external controller.

According to still another aspect of the present invention, in the vehicle communication system, it is preferable that the communication module is able to acquire the power information indicating the reception intensity of the radio wave received from the access point, the in-vehicle controller further transmits the power information to the external controller, and based on the vehicle position information, the vehicle speed information, and the power information transmitted from the in-vehicle controller, the external controller transmits, to the in-vehicle controller, the candidate access point as the candidate for subsequent connection among the access points stored in the external storage.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a configuration example of a vehicle communication system according to a first embodiment;

FIG. 2 is a table illustrating one example of an AP table according to the first embodiment;

DETAILED DESCRIPTION OF THE PREFERRED EMBODIMENTS

Modes (embodiments) for carrying out the present invention will be described in detail with reference to the drawings. The present invention is not limited by contents described in the embodiments below. Moreover, components described below include those easily arrived by those skilled in the art, and those substantially identical to the components. Further, configurations described below can be combined as necessary. In addition, various omissions, replacements, or changes may be made to the configurations without departing from the gist of the present invention.

First Embodiment

Figure 3:
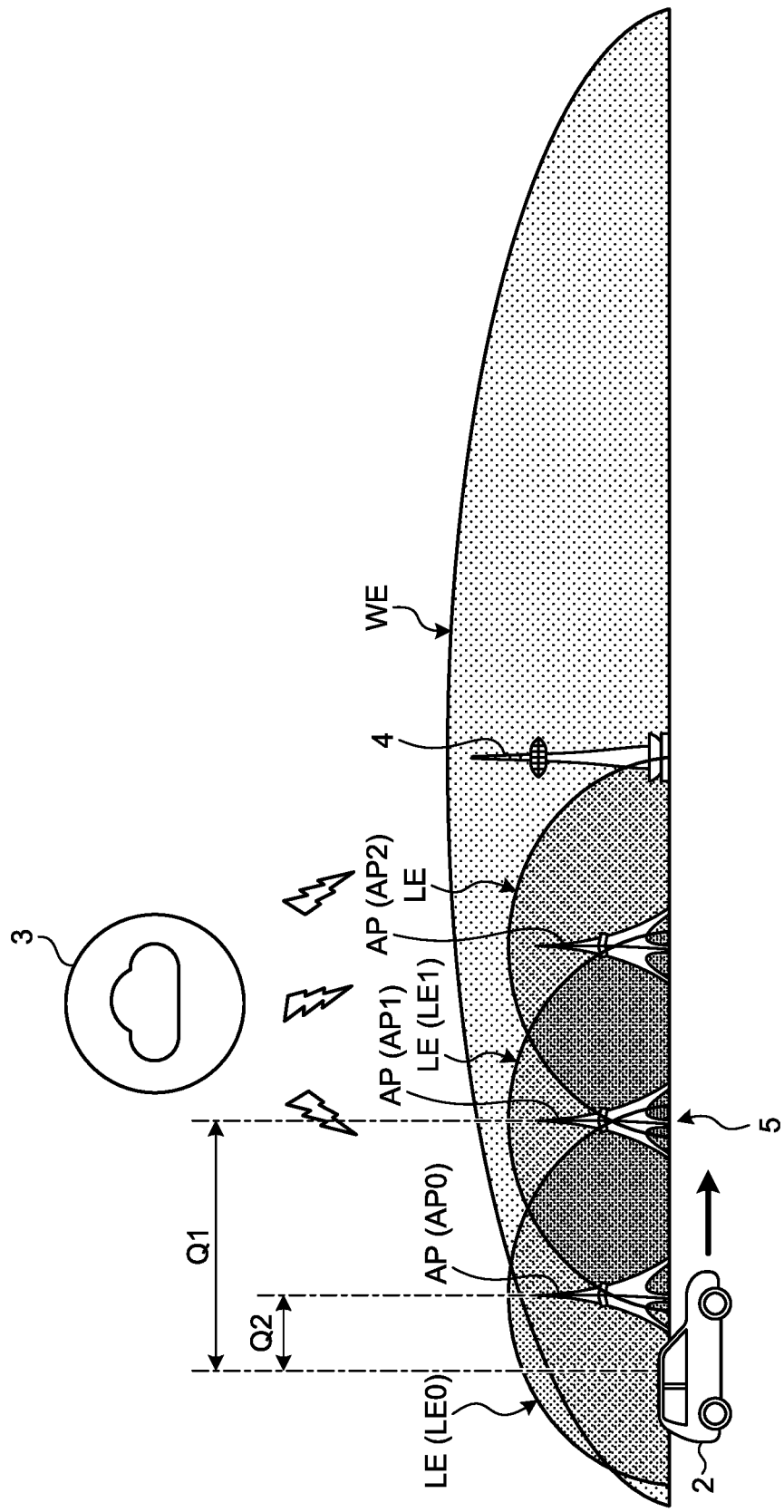
FIG. 3 is a schematic view illustrating an application example of the vehicle communication system according to the first embodiment.

A vehicle communication system 1 according to a first embodiment will be described. As illustrated in FIGS. 1 and 3, the vehicle communication system 1 is mounted on a vehicle 2, and is connected to an external communication network 3 via a communication relay access point AP provided outside the vehicle 2. The vehicle communication system 1 includes an in-vehicle router 10. The in-vehicle router 10 includes, for example, a mobile module 11, a Wi-Fi module 12a as a communication module, a global positioning system (GPS) 13 as a position acquirer, a vehicle speed acquirer 14, an in-vehicle memory 15 as an in-vehicle storage, and an in-vehicle CPU 16 as an in-vehicle controller.

The mobile module 11 is a wirelessly-communicable electronic component. The mobile module 11 adapts to wireless communication standards (a 3G mobile communication system) in accordance with International Mobile Telecommunication (IMT)-2000 or wireless communication standards (a 4G mobile communication system) in accordance with IMT-Advanced standards, for example. The mobile module 11 communicates with a base station 4 (see FIG. 3) for communication relay. The base station 4 described herein is a relay point for connection to the external communication network 3 (a mobile line) operated by, e.g., a communication service provider. The base station 4 communicates with the mobile module 11 in a region WE larger than that of the access point AP of the Wi-Fi module 12a. That is, the base station 4 is configured such that an area coverable by the individual base station 4 is larger than a region LE coverable by the individual access point AP. Thus, the base station 4 can build a communication network with the region WE larger than that of the access point AP. The mobile module 11 has an antenna 11a configured so that a radio wave can be transmitted to or received from the base station 4. The mobile module 11 is connected to the antenna 11a and the in-vehicle CPU 16, and outputs, to the in-vehicle CPU 16, a reception signal received from the base station 4 via the antenna 11a. Moreover, the mobile module 11 transmits a transmission signal output from the in-vehicle CPU 16 to the base station 4 via the antenna 11a.

The wireless fidelity (Wi-Fi) module 12a is a wirelessly-communicable electronic component. The Wi-Fi module 12a is in accordance with standards of a wireless local area network (LAN) 5. The Wi-Fi module 12a is connectable to the access point AP of the wireless LAN 5. The access point AP described herein is a relay point for connection to the external communication network 3 operated by, e.g., the communication service provider via the wireless LAN 5. The access point AP is communicable with the Wi-Fi module 12a in the predetermined region LE. The access point AP communicates with the Wi-Fi module 12a in the region LE smaller than that of the base station 4 of the mobile module 11. That is, the access point AP is configured such that the region LE coverable by the individual access point AP is smaller than the region WE coverable by the individual base station 4. The Wi-Fi module 12a has an antenna 12c configured so that a radio wave can be transmitted to or received from the access point AP. The Wi-Fi module 12a is connected to the antenna 12c and the in-vehicle CPU 16, and outputs, to the in-vehicle CPU 16, a reception signal received from the access point AP via the antenna 12c. Moreover, the Wi-Fi module 12a transmits a transmission signal output from the in-vehicle CPU 16 to the access point AP via the antenna 12c.

The GPS 13 is an electronic component configured to acquire vehicle position information indicating the position of the vehicle 2. The GPS 13 has an antenna 13a configured to receive a positioning signal from a satellite. The GPS 13 measures a current position based on the positioning signal received via the antenna 13a, thereby generating the vehicle position information indicating the measured current position. The GPS 13 is connected to the in-vehicle CPU 16, and outputs the generated vehicle position information to the in-vehicle CPU 16.

The vehicle speed acquirer 14 is an electronic component configured to acquire vehicle speed information indicating the speed of the vehicle 2. The vehicle speed information described herein is information indicating the speed of the vehicle 2 and a traveling direction of the vehicle 2, and is information represented by a vector amount (a magnitude and a direction). Moreover, the speed is a scalar quantity indicating only a speed level. The vehicle speed acquirer 14 acquires speed information indicating the speed of the vehicle 2 measured based on the number of rotations of a tire of the vehicle 2, for example. Note that the vehicle speed acquirer 14 may acquire the speed of the vehicle 2 measured based on other parameters than the number of rotations of the tire. Moreover, the vehicle speed acquirer 14 acquires traveling direction information indicating the traveling direction of the vehicle 2 output from a direction sensor, for example. Note that the vehicle speed acquirer 14 may acquire the traveling direction information indicating the traveling direction of the vehicle 2 obtained based on a change in a traveling position of the vehicle 2. The vehicle speed acquirer 14 is connected to the in-vehicle CPU 16, and outputs, to the in-vehicle CPU 16, the vehicle speed information including the acquired speed information and the acquired traveling direction information.

The in-vehicle memory 15 is an electronic component configured to store data. The in-vehicle memory 15 is mounted on the vehicle 2, and stores conditions or information necessary for various types of processing in the in-vehicle CPU 16, various programs or applications executed in the in-vehicle CPU 16, and control data, for example. Moreover, the in-vehicle memory 15 also stores an AP table TB1 regarding the access point AP and map data. As illustrated in FIG. 2, the AP table TB1 registers, for each access point AP, a service set identifier (SSID), a password, a position, a security method, and a frequency (ch). The SSID is an identifier for identifying the access point AP. The password is information for permitting connection to the access point AP. The position is information indicating the position of the access point AP on a map. The security method is a method for encrypting communication between the Wi-Fi module 12*a* and the access point AP, and includes WEP, WPA, and WPA2, for example. The frequency (ch) is a frequency to be used in communication between the Wi-Fi module 12*a* and the access point AP. For the frequency (ch), the same frequency channel is used in communication between the Wi-Fi module 12*a* and the access point AP. The AP table TB1 stored in the in-vehicle memory 15 is updated as necessary. The in-vehicle memory 15 can temporarily store, for example, the vehicle speed information acquired by the vehicle speed acquirer 14 and the vehicle position information acquired by the GPS 13. The in-vehicle memory 15 is connected to the in-vehicle CPU 16, and these types of information are read as necessary by the in-vehicle CPU 16.

The in-vehicle CPU 16 controls each electronic component. The in-vehicle CPU 16 is connected to the mobile module 11, and a reception signal output from the mobile module 11 is input to the in-vehicle CPU 16. Moreover, the in-vehicle CPU 16 outputs a transmission signal to the mobile module 11. The in-vehicle CPU 16 is connected to the Wi-Fi module 12*a*, and a reception signal output from the Wi-Fi module 12*a* is input to the in-vehicle CPU 16. Moreover, the in-vehicle CPU 16 outputs a transmission signal to the Wi-Fi module 12*a*. The in-vehicle CPU 16 is connected to the GPS 13, and the vehicle position information output from the GPS 13 is input to the in-vehicle CPU 16. The in-vehicle CPU 16 is connected to the vehicle speed acquirer 14, and the vehicle speed information output from the vehicle speed acquirer 14 is input to the in-vehicle CPU 16. The in-vehicle CPU 16 is connected to the in-vehicle memory 15 such that various types of information are written in the in-vehicle memory 15 or are read from the in-vehicle memory 15. For example, the in-vehicle CPU 16 reads the AP table TB1 stored in the in-vehicle memory 15, thereby determining the access point AP to be subsequently connected among the access points AP of the AP table TB1. The in-vehicle CPU 16 determines the subsequent access point AP from the highly-reliable access points AP registered in the AP table TB1, and therefore, security can be improved.

The in-vehicle CPU 16 updates, as necessary, the AP table TB1 stored in the in-vehicle memory 15 via the Wi-Fi module 12*a* or the mobile module 11. In a case where the Wi-Fi module 12*a* is connectable to the access point AP, the in-vehicle CPU 16 updates the AP table TB1 via the Wi-Fi module 12*a*. In this manner, the in-vehicle CPU 16 reduces use of the mobile line whose communication cost tends to be relatively high, and therefore, can reduce the communication cost. Moreover, in a case where the Wi-Fi module 12*a* is not connectable to the access point AP, the in-vehicle CPU 16 updates the AP table TB1 via the mobile module 11. In this manner, the in-vehicle CPU 16 can update the AP table TB1 even outside the region LE of the access point AP. Note that the in-vehicle CPU 16 may update, as necessary, the AP table TB1 stored in the in-vehicle memory 15 via an external storage medium such as a CD-ROM or the USB. Alternatively, the in-vehicle CPU 16 may update, as necessary, the AP table TB1 stored in the in-vehicle memory 15 via near field communication (NFC) or a radio frequency identifier (RFID).

Figure 4:
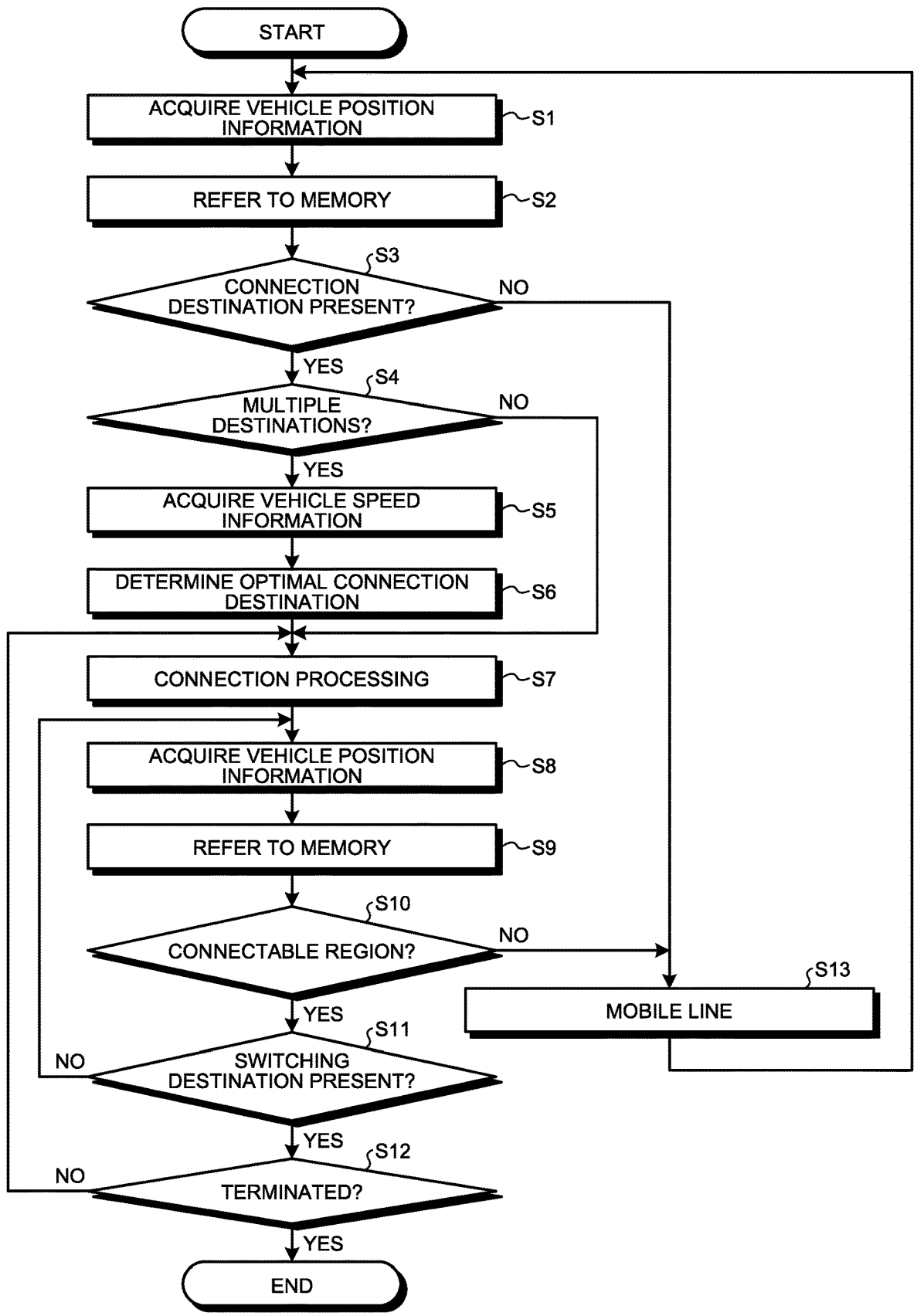
FIG. 4 is a flowchart illustrating an operation example of the vehicle communication system according to the first embodiment.

Next, an operation example of the vehicle communication system 1 will be described with reference to FIGS. 3 and 4. The vehicle communication system 1 is activated in such a manner that an ignition (IG) power supply or an accessory (ACC) power supply is turned ON. For example, as illustrated in FIG. 3, the vehicle 2 belongs to a region LE0 where transmission/reception between the Wi-Fi module 12*a* and an access point AP0 is allowed. At this point, the GPS 13 acquires the vehicle position information (step S1), and outputs the acquired vehicle position information to the in-vehicle CPU 16. Next, the in-vehicle CPU 16 refers to the AP table TB1 stored in the in-vehicle memory 15 (step S2), and determines whether or not there is an access point AP as a connection destination (step S3). For example, the in-vehicle CPU 16 searches the position of the access point AP described in the AP table TB1 based on the position of the vehicle 2 indicated by the vehicle position information, and extracts the access point AP relatively close to the position of the vehicle 2. That is, the in-vehicle CPU 16 extracts the access point AP at which disconnection does not occur upon switching from the connected access point AP to another access point AP. In a case where there is the extracted access point AP (step S3; Yes), the in-vehicle CPU 16 determines whether or not such an access point AP includes multiple access points AP (step S4). In a case where there are multiple access points AP (step S4; Yes), the in-vehicle CPU 16 acquires the vehicle speed information indicating the speed of the vehicle 2 and the traveling direction of the vehicle 2 (step S5). Next, the in-vehicle CPU 16 determines an optimal connection destination (step S6). For example, the in-vehicle CPU 16 determines, based on the vehicle position information and the vehicle speed information, the access point AP to be connected to the Wi-Fi module 12*a* among the multiple access points AP. For example, in a case where the speed in the vehicle speed information is relatively slow, the in-vehicle CPU 16 determines, as a subsequent connection destination, a first access point AP1 of the multiple access points AP (AP0, AP1, AP2). In a case where the speed in the vehicle speed information is relatively fast, the in-vehicle CPU 16 determines, as the subsequent connection destination, a second access point AP2 farther from the vehicle 2 than the first access point AP1 is among the multiple access points AP (AP0, AP1, AP2). In other words, in a case where the speed in the vehicle speed information indicates a first speed (e.g., 30 km/h), the in-vehicle CPU 16 determines, as the subsequent connection destination, the first access point AP1 among the multiple access points AP (AP0, AP1, AP2). In a case where the speed in the vehicle speed information is a second speed (e.g., 60 km/h) faster than the first speed, the in-vehicle CPU 16 determines, as the subsequent connection destination, the second access point AP2 farther from the vehicle 2 than the first access point AP1 is among the multiple access points AP (AP0, AP1, AP2). Thus, the in-vehicle CPU 16 can be connected to the second access point AP2 somewhat farther from the vehicle 2 than the first access point AP1 is without being connected to the closest first access point AP1 that the vehicle 2 passes by in a moment. Next, the in-vehicle CPU 16 is connected to the determined access point AP via the Wi-Fi module 12a (step S7). For example, at the access point AP with a coincident frequency (ch), the Wi-Fi module 12a confirms with the access point AP regarding whether or not the identifier (SSID) of the access point AP is proper. When the SSID is confirmed, the Wi-Fi module 12a applies for authorization for connection to the access point AP based on the security method, the password, etc. When connection to the access point AP is authorized, the Wi-Fi module 12a requests connection to the access point AP (an association request). When the association request is permitted by the access point AP, the Wi-Fi module 12a completes connection to the access point AP.

Next, the GPS 13 acquires the vehicle position information again (step S8), and outputs the acquired vehicle position information to the in-vehicle CPU 16. The in-vehicle CPU 16 refers to the AP table TB1 stored in the in-vehicle memory 15 (step S9), and determines whether or not the position of the vehicle 2 is included in the connectable region LE of the access point AP (step S10). The in-vehicle CPU 16 specifies the connectable region LE of the access point AP from the position of the access point AP in the AP table TB1, for example. Then, in a case where the position of the vehicle 2 is included in the specified region LE (step S10; Yes), the in-vehicle CPU 16 determines whether or not there is an access point AP as a switching destination (step S11). In a case where there is the access point AP as the switching destination (step S11; Yes), the in-vehicle CPU 16 determines whether or not the processing is to be temporarily terminated before connection processing (step S12). For example, in a case where the IG power supply or the ACC power supply is turned OFF (step S12; Yes), the in-vehicle CPU 16 terminates the processing. In a case where the processing is not to be terminated (step S12; No), the processing returns to step S7, and the in-vehicle CPU 16 is connected to the access point AP as the switching destination via the Wi-Fi module 12a. The in-vehicle CPU 16 gives higher priority to connection via the Wi-Fi module 12a than connection via the mobile module 11. Thus, use of the mobile line is reduced, and therefore, the communication cost can be reduced.

Note that at the above-described step S3, in a case where there is no access point AP as the connection destination (step S3; No), the in-vehicle CPU 16 is connected to the mobile line via the mobile module 11 (step S13). In this manner, the in-vehicle CPU 16 can reduce communication disconnection. Moreover, the in-vehicle CPU 16 stops the function of the Wi-Fi module 12a or powers OFF the Wi-Fi module 12a so that power consumption can be reduced. Next, the in-vehicle CPU 16 acquires the vehicle position information again (step S1). At the above-described step S4, in a case where there are no multiple access points AP (step S4; No), the in-vehicle CPU 16 is connected to a predetermined access point AP via the Wi-Fi module 12a (step S7). At the above-described step S10, in a case where the position of the vehicle 2 is not included in the region LE of the access point AP (step S10; No), connection to the mobile line via the mobile module 11 is made (step S13). At the above-described step S11, in a case where there is no access point AP as the switching destination (step S11; No), the in-vehicle CPU 16 acquires the vehicle position information again (step S8).

As described above, the vehicle communication system 1 according to the first embodiment includes the in-vehicle router 10. The in-vehicle router 10 includes the Wi-Fi module 12a, the GPS 13, the vehicle speed acquirer 14, and the in-vehicle CPU 16. The Wi-Fi module 12a is a module mounted on the vehicle 2 and configured connectable to the access point AP of the wireless LAN 5. The GPS 13 acquires the vehicle position information indicating the position of the vehicle 2. The vehicle speed acquirer 14 acquires the vehicle speed information indicating the speed of the vehicle 2. The in-vehicle CPU 16 determines the access point AP to be connected to the Wi-Fi module 12a based on the vehicle position information and the vehicle speed information.

With this configuration, in a case where the speed of the vehicle 2 is relatively fast, the vehicle communication system 1 can be, without being connected to the closest first access point AP1 that the vehicle 2 passes by in a moment, connected to the second access point AP2 somewhat farther from the vehicle 2 than the first access point AP1 is, for example. Thus, the vehicle communication system 1 can reduce, for example, a situation where the vehicle communication system 1 passes by a connectable region LE1 of the first access point AP1 during an authorization process for the first access point AP1 and an authorization process for the second access point AP2 is performed. Thus, the vehicle communication system 1 can reduce continuous repetition of the authorization process, and therefore, can reduce disconnection from the external communication network 3. Consequently, the vehicle communication system 1 can be seamlessly connected to the access point AP, and as a result, can be properly connected to the access point AP.

On the other hand, in a case where the speed of the vehicle 2 is relatively slow, the vehicle communication system 1 can be connected to even the first access point AP1 because the vehicle 2 does not pass by the connectable region LE1 of the first access point AP1 in a moment. Thus, the vehicle communication system 1 can perform the authorization process for the second access point AP2 right before a communicable state with the first access point AP1 is brought through the authorization process and the vehicle 2 passes by the connectable region LE1 of the first access point AP, for example. Thus, the vehicle communication system 1 can reduce continuous repetition of the authorization process, and therefore, can reduce disconnection from the external communication network 3. Consequently, the vehicle communication system 1 can be seamlessly connected to the access point AP, and as a result, can be properly connected to the access point AP.

In the above-described vehicle communication system 1, in a case where the speed in the vehicle speed information indicates the first speed, the in-vehicle CPU 16 determines, as the subsequent connection destination, the first access point AP1 of the multiple access points AP. In a case where the speed in the vehicle speed information indicates the second speed faster than the first speed, the in-vehicle CPU 16 determines, as the subsequent connection destination, the second access point AP2 farther from the vehicle 2 than the first access point AP1 among the multiple access points AP. With this configuration, in a case where the speed of the vehicle 2 is relatively fast, the vehicle communication system 1 can be connected to the distant access point AP without being connected to the closest access point AP. Thus, the vehicle communication system 1 can reduce continuous repetition of the authorization process, and therefore, can be properly connected to the access point AP.

The above-described vehicle communication system 1 includes the in-vehicle memory 15 mounted on the vehicle 2 and storing the access points AP. The in-vehicle CPU 16 determines the access point AP to be subsequently connected among the access points AP stored in the in-vehicle memory 15. With this configuration, the in-vehicle CPU 16 can refer to the in-vehicle memory 15 to acquire the access point AP. Moreover, the in-vehicle CPU 16 determines the subsequent access point AP from the highly-reliable access points AP registered in advance in the in-vehicle memory 15, and therefore, the security can be improved. Further, the in-vehicle CPU 16 can use other access points AP than a free access point AP (so-called Free Wi-Fi), and therefore, a communication area for communication via the Wi-Fi module 12a can be expanded. Thus, the in-vehicle CPU 16 can reduce the communication cost.

First Variation of First Embodiment

Figure 5:
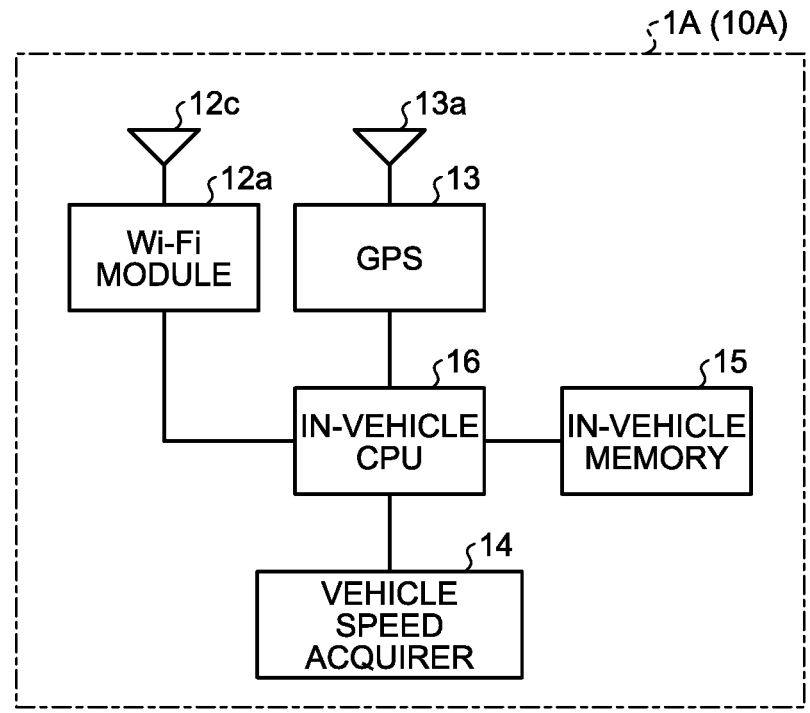
FIG. 5 is a block diagram illustrating a configuration example of a vehicle communication system according to a first variation of the first embodiment.

Next, a vehicle communication system 1A (an in-vehicle router 10A) according to a first variation of the first embodiment will be described. Note that in the first variation of the first embodiment, the same reference numerals are used to represent components equivalent to those of the first embodiment, and detailed description thereof will be omitted. The vehicle communication system 1A according to the first variation of the first embodiment is different from the vehicle communication system 1 of the first embodiment in that no mobile module 11 is provided. As illustrated in FIG. 5, the vehicle communication system 1A includes the Wi-Fi module 12a, the GPS 13, the vehicle speed acquirer 14, the in-vehicle memory 15, and the in-vehicle CPU 16. The vehicle communication system 1A does not include the mobile module 11, and therefore, is not connected to the mobile line. In a case where there is no access point AP as the connection destination while the vehicle 2 is traveling, the vehicle communication system 1A continuously acquires the vehicle position information, and searches the position of the access point AP described in the AP table TB1 based on the acquired vehicle position information. The vehicle communication system 1A cannot be connected to the external communication network 3 while the access point AP as the connection destination is being searched during traveling of the vehicle 2. However, since the mobile module 11 is not necessary, the number of components can be reduced. Thus, an increase in the size of the system can be suppressed. Moreover, since the vehicle communication system 1A does not use the mobile line, the communication cost can be reduced. Further, since the power of the Wi-Fi module 12a is saved, power consumption can be reduced.

Second Variation of First Embodiment

Figure 6:
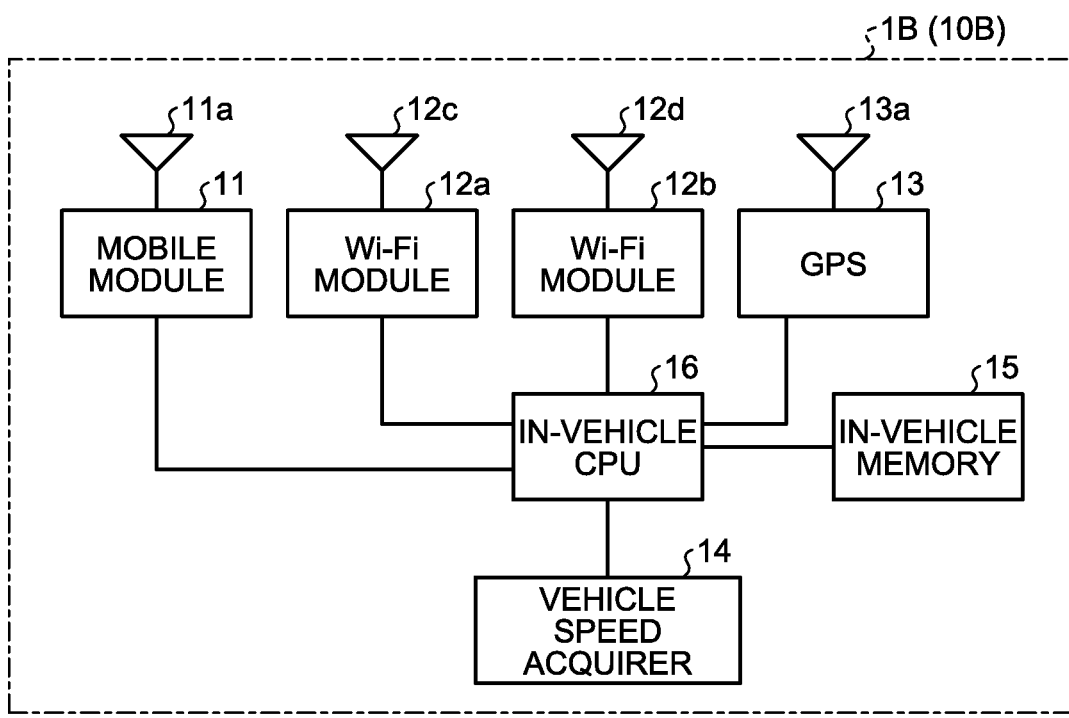
FIG. 6 is a block diagram illustrating a configuration example of a vehicle communication system according to a second variation of the first embodiment.

Next, a vehicle communication system 1B (an in-vehicle router 10B) according to a second variation of the first embodiment will be described. Note that in the second variation of the first embodiment, the same reference numerals are used to represent components equivalent to those of the first embodiment, and detailed description thereof will be omitted. The vehicle communication system 1B according to the second variation of the first embodiment is different from the vehicle communication system 1 of the first embodiment in that two Wi-Fi modules 12a, 12b are provided. As illustrated in FIG. 6, the vehicle communication system 1B includes the mobile module 11, the Wi-Fi modules 12a, 12b, the GPS 13, the vehicle speed acquirer 14, the in-vehicle memory 15, and the in-vehicle CPU 16.

The Wi-Fi module 12b different from the above-described Wi-Fi module 12a is a wirelessly-communicable electronic component. The Wi-Fi module 12b is in accordance with the standards of the wireless LAN 5, these standards being the same communication standards as those of the Wi-Fi module 12a. The Wi-Fi module 12b is connectable to the access point AP of the wireless LAN 5. The Wi-Fi module 12b has an antenna 12d configured so that a radio wave can be transmitted to or received from the access point AP. The Wi-Fi module 12b is connected to the antenna 12d and the in-vehicle CPU 16, and outputs, to the in-vehicle CPU 16, a reception signal received from the access point AP via the antenna 12d. Moreover, the Wi-Fi module 12b transmits a transmission signal output from the in-vehicle CPU 16 to the access point AP via the antenna 12d.

The in-vehicle CPU 16 switches between the Wi-Fi module 12a and the Wi-Fi module 12b according to the access point AP. For example, when data is transmitted to or received from the external communication network 3 via the Wi-Fi module 12a, if a reception status of the Wi-Fi module 12a becomes worse than that of the Wi-Fi module 12b, the in-vehicle CPU 16 switches connection from the Wi-Fi module 12a to the Wi-Fi module 12b.

Figure 7:
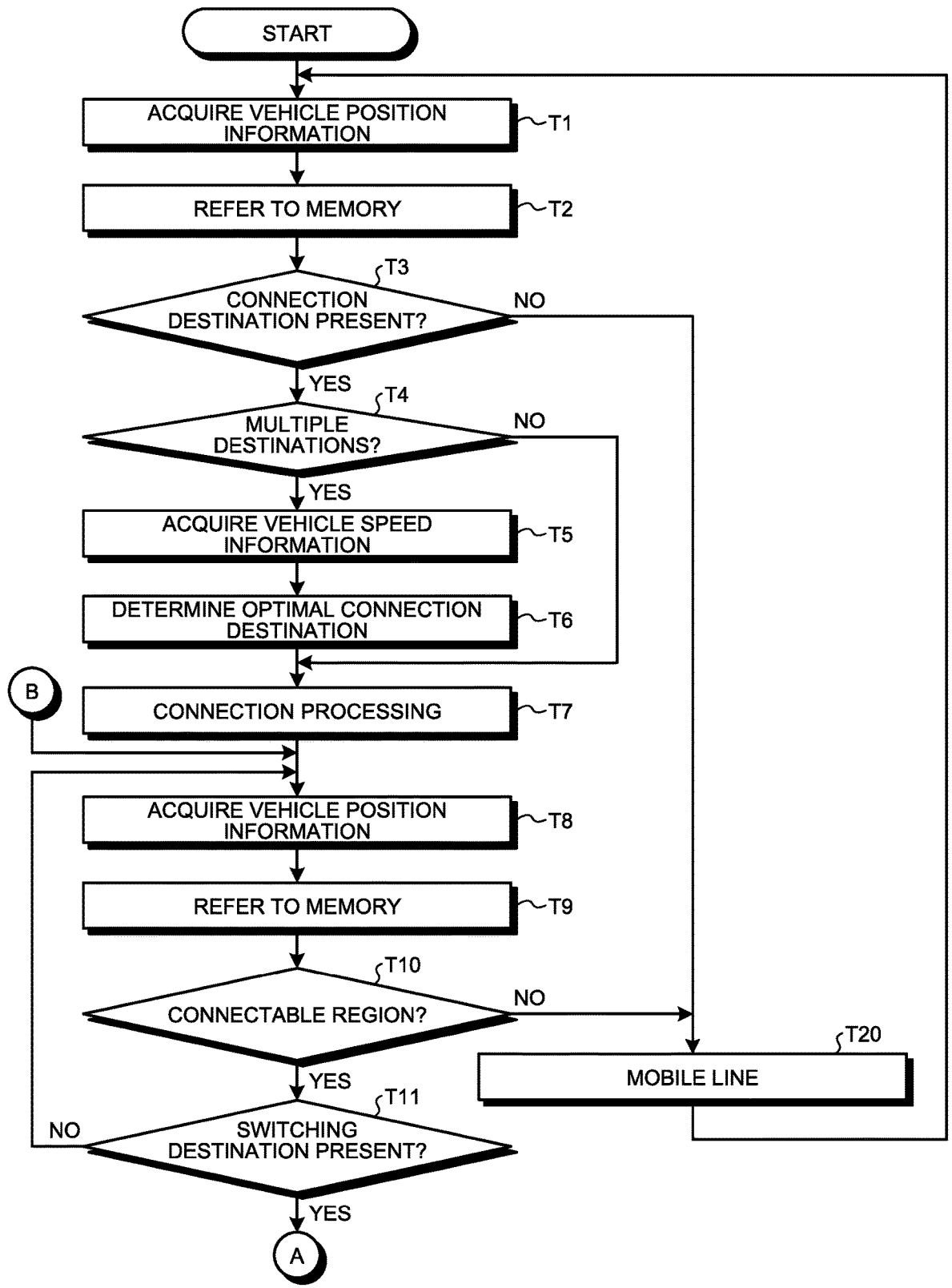
FIG. 7 is a flowchart (No. 1) illustrating an operation example of the vehicle communication system according to the second variation of the first embodiment.
Figure 8:
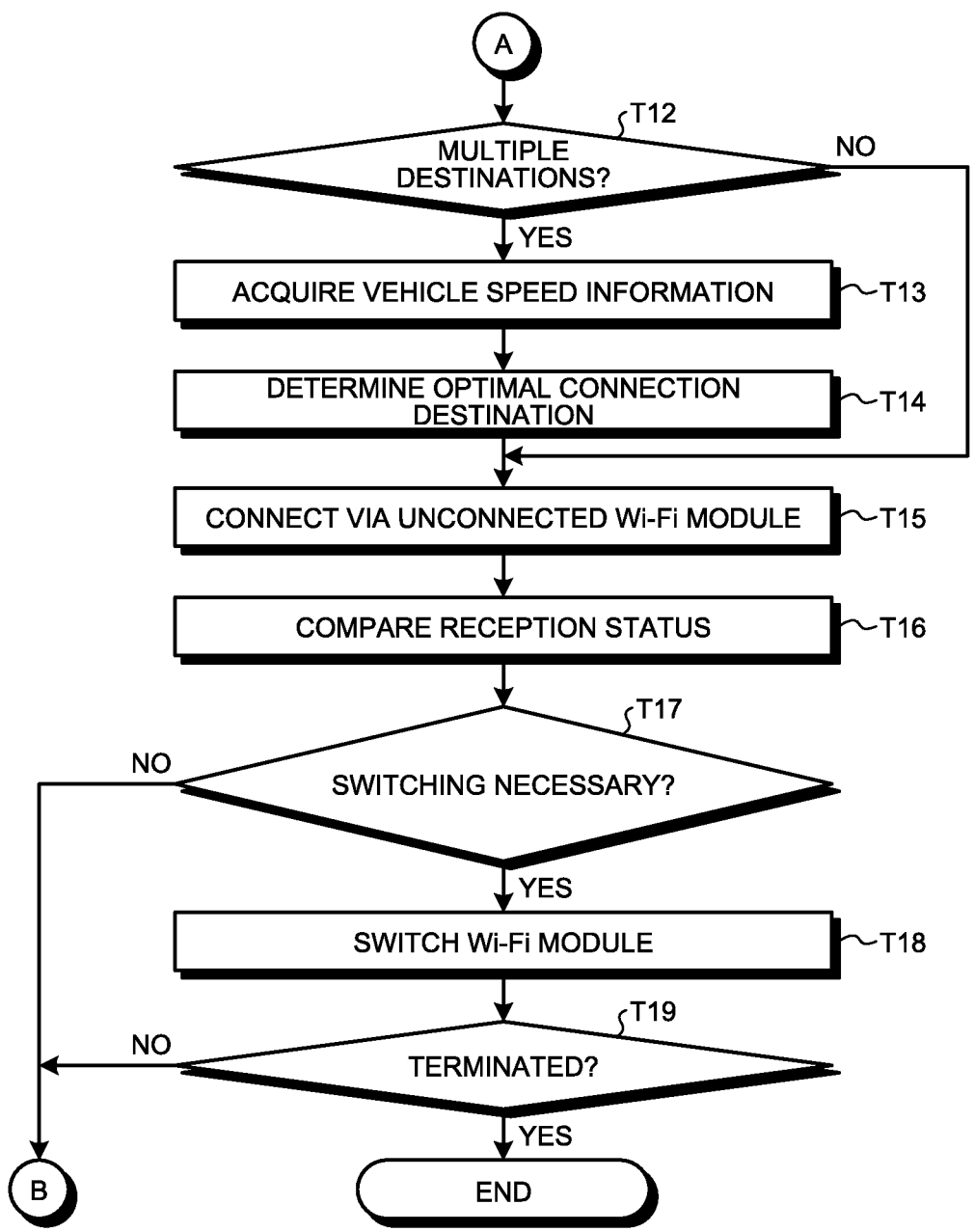
FIG. 8 is a flowchart (No. 2) illustrating the operation example of the vehicle communication system according to the second variation of the first embodiment.

Next, an operation example of the vehicle communication system 1B will be described with reference to FIGS. 7 and 8. Note that steps T1 to T11 of a flowchart illustrated in FIG. 7 each correspond to the steps S1 to S11 of the flowchart illustrated in FIG. 4, and therefore, detailed description thereof will be omitted. In the flowcharts of FIGS. 7 and 8, "A" described in FIG. 7 is connected to "A" described in FIG. 8, and "B" described in FIG. 7 is connected to "B" described in FIG. 8. The vehicle communication system 1B is activated in such a manner that the IG power supply or the ACC power supply is turned ON. For example, as illustrated in FIG. 3, the vehicle 2 belongs to the region LE1 where transmission/reception between the Wi-Fi module 12a, 12b and the first access point AP1 is allowed. The GPS 13 acquires the vehicle position information (step T1), and outputs the acquired vehicle position information to the in-vehicle CPU 16. Next, the in-vehicle CPU 16 refers to the AP table TB1 stored in the in-vehicle memory 15 (step T2). In a case where there is an access point AP as the connection destination (step T3; Yes), the in-vehicle CPU 16 determines whether or not the access point AP includes multiple access points AP (step T4). In a case where there are multiple access points AP (step T4: Yes), the in-vehicle CPU 16 acquires the vehicle speed information indicating the speed of the vehicle 2 and the traveling direction of the vehicle 2 (step T5). Next, the in-vehicle CPU 16 determines the optimal connection destination (step T6), and is connected to the determined access point AP via the Wi-Fi module 12a (step T7). Next, the GPS 13 acquires the vehicle position information again (step T8), and outputs the acquired vehicle position information to the in-vehicle CPU 16. Next, the in-vehicle CPU 16 refers to the AP table TB1 stored in the in-vehicle memory 15 (step T9). In a case where the position of the vehicle 2 is included in the connectable region LE of the access point AP (step T10; Yes), it is determined whether or not there is an access point AP as the switching destination (step T11). In a case where there is the access point AP as the switching destination (step T11; Yes), the in-vehicle CPU 16 determines whether or not there are multiple access points AP (step T12). In a case where there are multiple access points AP (step T12; Yes), the in-vehicle CPU 16 acquires the vehicle speed information indicating the speed of the vehicle 2 and the traveling direction of the vehicle 2 (step T13). Next, the in-vehicle CPU 16 determines the optimal connection destination (step T14), and is connected to the subsequent access point AP via the Wi-Fi module 12*b* not currently connected to the access point AP (step T15). That is, the in-vehicle CPU 16 is preparatorily connected to the subsequent access point AP via the Wi-Fi module 12*b* different from the currently-connected Wi-Fi module 12*a*. Specifically, in a state in which data is transmitted to or received from the access point AP0 via the Wi-Fi module 12*a*, the in-vehicle CPU 16 is preparatorily connected to the second access point AP2 via the Wi-Fi module 12*b*. Next, the in-vehicle CPU 16 compares the reception status of the Wi-Fi module 12*a* and the reception status of the Wi-Fi module 12*b* (step T16). Then, in a case where the reception status of the Wi-Fi module 12*a* is worse than that of the Wi-Fi module 12*b*, the in-vehicle CPU 16 determines that switching is necessary (step T17; Yes), and switches connection from the Wi-Fi module 12*a* to the Wi-Fi module 12*b* (step T18). The in-vehicle CPU 16 re-determines whether or not the processing is to be temporarily terminated before the vehicle position information is acquired (step T19). For example, in a case where the IG power supply or the ACC power supply is turned OFF (step T19; Yes), the in-vehicle CPU 16 terminates the processing. In a case where the processing is not to be terminated (step T19; No), the processing returns to step T8, and the in-vehicle CPU 16 acquires the vehicle position information by the GPS 13. Note that at the above-described step T12, in a case where there are no multiple access points AP (step T12; No), connection to the subsequent access point AP via the Wi-Fi module 12*b* not currently connected to the access point AP is made (step T15). At the above-described step T17, in a case where it is determined that switching is not necessary (step T17; No), the processing returns to step T8, and the in-vehicle CPU 16 acquires the vehicle position information by the GPS 13. In a case where there is not an access point AP as the connection destination (step T3; No), the in-vehicle CPU 16 uses the mobile line (step T20). In a case where the position of the vehicle 2 is not included in the connectable region LE of the access point AP (step T10; No), the in-vehicle CPU 16 uses the mobile line (step T20).

As described above, the vehicle communication system 1B according to the second variation of the first embodiment is connected to the subsequent access point AP via the Wi-Fi module 12*b* not connected to the access point AP. Thus, at the time of passing the access point AP, the authorization process for the subsequent access point AP can be done in advance. Thus, even at the time of passing the access point AP, the vehicle communication system 1B can seamlessly perform communication without communication disconnection by each Wi-Fi module 12*a*, 12*b*. As a result, the vehicle communication system 1B can be properly connected to the access point AP.

Third Variation of First Embodiment

Next, a third variation of the first embodiment will be described. Note that in the third variation of the first embodiment, the same reference numerals are used to represent components equivalent to those of the first embodiment, and detailed description thereof will be omitted. The vehicle communication system 1 according to the third variation of the first embodiment is different from the vehicle communication system 1 according to the first embodiment in that the access point AP to be connected to the Wi-Fi module 12*a* is determined based on power information in addition to the vehicle position information and the vehicle speed information.

The Wi-Fi module 12*a* can acquire the power information indicating the reception intensity of a radio wave received from the access point AP. The reception intensity of the radio wave received by the Wi-Fi module 12*a* as described herein is generally higher as a distance between the Wi-Fi module 12*a* and the access point AP decreases, and is lower as the distance between the Wi-Fi module 12*a* and the access point AP increases. For example, in the vehicle 2 illustrated in FIG. 3, the Wi-Fi module 12*a* mounted on the vehicle 2 has a shorter distance Q2 to the access point AP0 than a distance Q1 to the first access point AP1. In this case, the reception intensity of the radio wave received by the Wi-Fi module 12*a* is higher at the access point AP0 than at the first access point AP1. Further, the reception intensity of the radio wave is higher at the first access point AP1 than at the second access point AP2, and is higher at the second access point AP2 than a third access point AP3 (not illustrated in the figure). The third access point AP3 described herein is positioned at a location farther from the vehicle 2 than the first and second access points AP1, AP2 are. In this case, the reception intensity of the radio wave satisfies a relationship of the access point AP0>the first access point AP1>the second access point AP2>the third access point AP3.

The in-vehicle CPU 16 determines the access point AP to be connected to the Wi-Fi module 12*a* based on the vehicle position information, the vehicle speed information, and the power information indicating the reception intensity of the radio wave. For example, in a case where the speed in the vehicle speed information is the first speed (e.g., 30 km/h), the in-vehicle CPU 16 determines, as the subsequent connection destination, the first access point AP1 greatest in the power in the power information among the multiple access points AP (AP1, AP2, AP3). On the other hand, in a case where the speed in the vehicle speed information is the second speed (e.g., 60 km/h) faster than the first speed, the in-vehicle CPU 16 determines, as the subsequent connection destination, the second access point AP2 assumed farther from the vehicle 2 than the first access point AP1 and greatest in the power in the power information upon connection among the multiple access points AP (AP1, AP2, AP3). With this configuration, the vehicle communication system 1 can be connected to the access point AP with relatively-high reception intensity, and therefore, connectivity to the access point AP can be improved.

Second Embodiment

Figure 9:
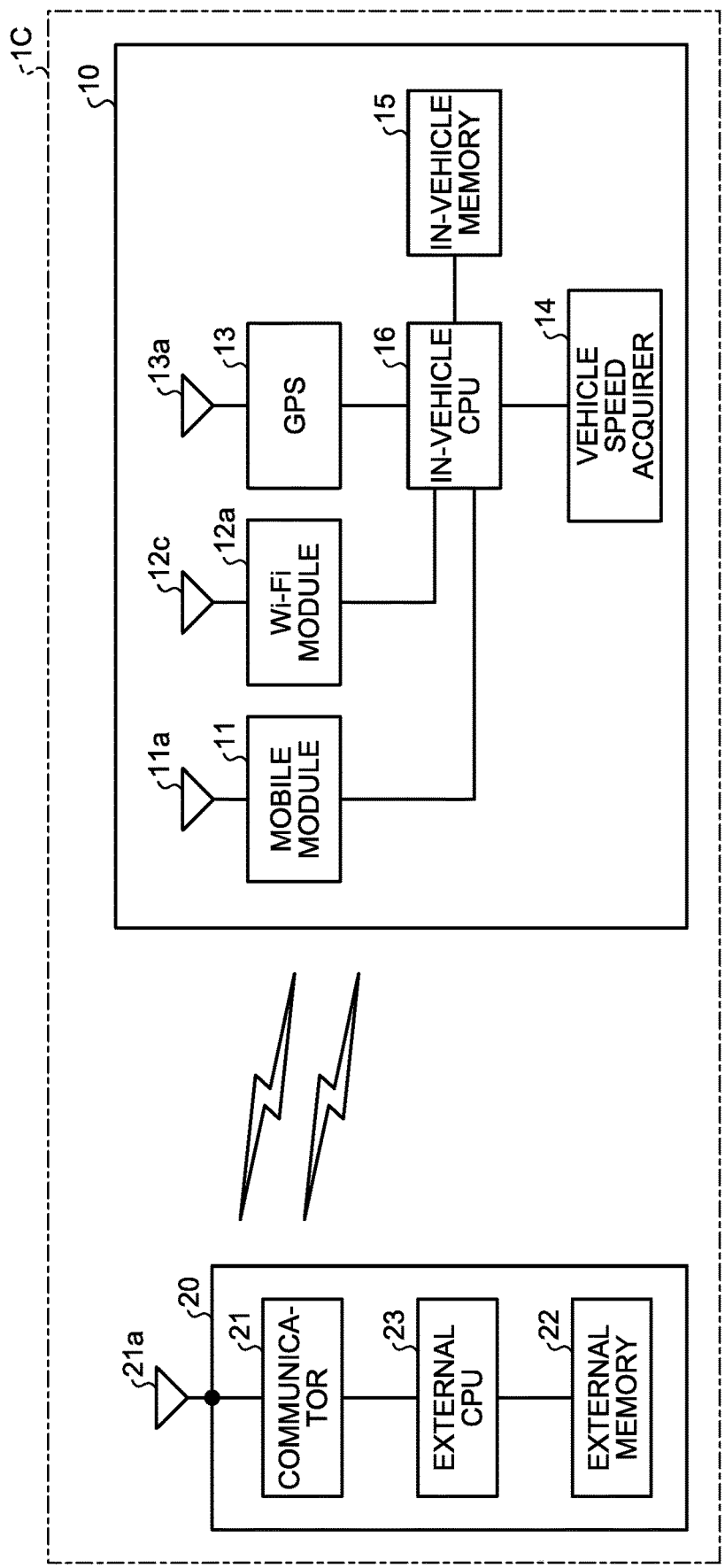
FIG. 9 is a block diagram illustrating a configuration example of a vehicle communication system according to a second embodiment.

Next, a vehicle communication system 1C according to a second embodiment will be described. Note that in the second embodiment, the same reference numerals are used to represent components similar to those of the first embodiment, and detailed description thereof will be omitted. The vehicle communication system 1C according to the second embodiment is different from the vehicle communication system 1 of the first embodiment in that an external device 20 is provided. As illustrated in FIG. 9, the vehicle communication system 1C includes an in-vehicle router 10 and the external device 20. The in-vehicle router 10 is mounted on a vehicle 2, and wirelessly communicates with the external device 20. The in-vehicle router 10 includes a mobile module 11, a Wi-Fi module 12*a*, a GPS 13, a vehicle speed acquirer 14, an in-vehicle memory 15, and an in-vehicle CPU 16. The in-vehicle router 10 wirelessly communicates with the external device 20 via the mobile module 11 or the Wi-Fi module 12*a*.

The external device 20 is provided outside the vehicle 2, and wirelessly communicates with the in-vehicle router 10. The external device 20 includes a communicator 21, an external memory 22 as an external storage, and an external CPU 23 as an external controller.

The communicator 21 is a wirelessly-communicable electronic component. The communicator 21 wirelessly communicates with the in-vehicle router 10, for example. The communicator 21 has an antenna 21*a* configured so that a radio wave can be transmitted to or received from the in-vehicle router 10. The communicator 21 is connected to the antenna 21*a* and the external CPU 23, and outputs, to the external CPU 23, a reception signal received from the in-vehicle router 10 via the antenna 21*a*. Moreover, the communicator 21 transmits a transmission signal output from the external CPU 23 to the in-vehicle router 10 via the antenna 21*a*.

The external memory 22 is an electronic component configured to store data. The external memory 22 stores conditions or information necessary for various types of processing in the external CPU 23, various programs or applications executed in the external CPU 23, and control data, for example. Moreover, the external memory 22 also stores an AP table TB2 regarding an access point AP and map data.

Figures 10, 11:
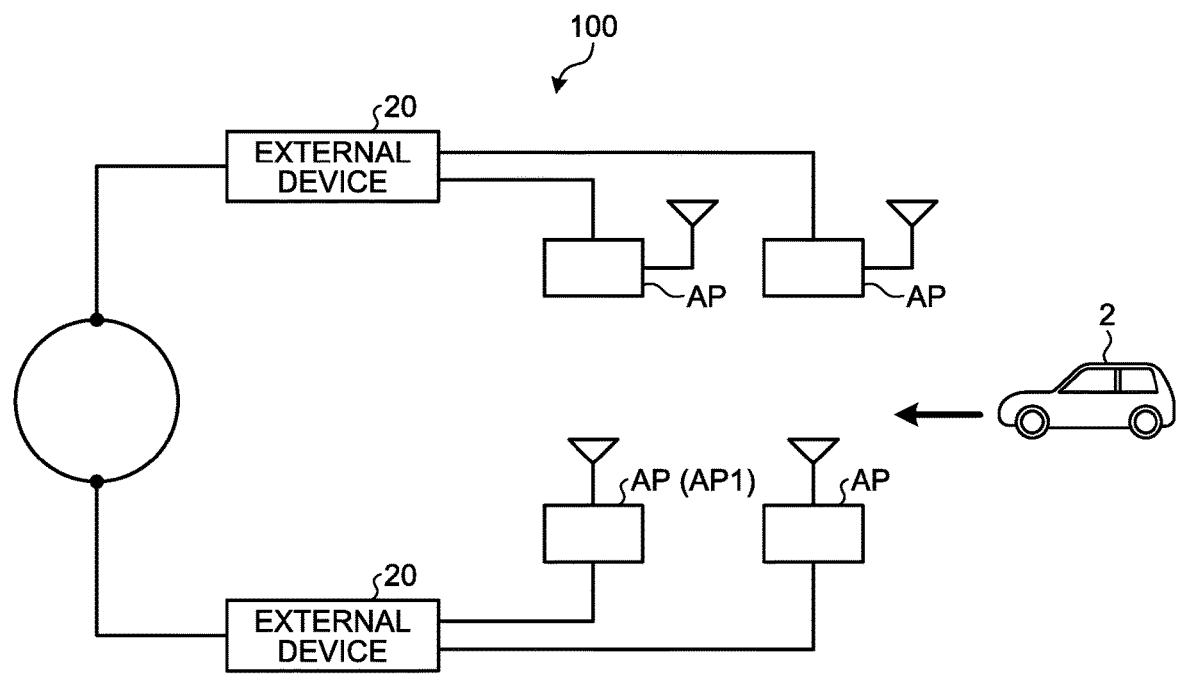
FIG. 10 is a table illustrating one example of an AP table according to the second embodiment.
FIG. 11 is a schematic diagram illustrating an application example of the vehicle communication system according to the second embodiment.

As illustrated in FIG. 10, the AP table TB2 registers, for each access point AP, an SSID, a password, a position, a security method, a frequency (ch), and a usage rate. The SSID, the password, the position, the security method, and the frequency (ch) are the same as those of the AP table TB1 illustrated in FIG. 2. The usage rate is the percentage of use of the access point AP, and indicates the degree of congestion at the access point AP. In the external memory 22, the AP table TB2 is updated as necessary. The external memory 22 is connected to the external CPU 23, and these types of information are read as necessary by the external CPU 23.

The external CPU 23 controls the communicator 21 and the external memory 22. The external CPU 23 is connected to the communicator 21, and a reception signal output from the communicator 21 is input to the external CPU 23. Moreover, the external CPU 23 outputs a transmission signal to the communicator 21. The external CPU 23 is connected to the external memory 22 such that various types of information are written in the external memory 22 or are read from the external memory 22. The external CPU 23 updates, as necessary, the AP table TB2 stored in the external memory 22. For example, the external CPU 23 registers the usage rate acquired from each access point AP in the AP table TB2. Moreover, the external CPU 23 registers the usage rate in the AP table TB2 based on usage of the access point AP received from the in-vehicle router 10. For example, the external CPU 23 obtains the usage rate based on the total counted number of connections of the access point AP received from the in-vehicle router 10, and registers the obtained usage rate in the AP table TB2. Note that in a case where the external CPU 23 has received information indicating unavailability of connection to the access point AP from the in-vehicle router 10, the external CPU 23 may delete such an access point AP from the AP table TB2. Thus, the external CPU 23 can improve reliability of the access point AP.

The external CPU 23 transmits information on the AP table TB2 stored in the external memory 22 to the in-vehicle router 10 via the communicator 21. For example, in a case where the AP table TB2 is updated, the external CPU 23 transmits information on all access points AP of the AP table TB2 to the in-vehicle router 10. Alternatively, the external CPU 23 may transmit information on the AP table TB2 to the in-vehicle router 10 according to a request from the in-vehicle router 10. In this case, in a case where the external CPU 23 has received, e.g., information including the position of the vehicle 2 from the in-vehicle router 10, the external CPU 23 transmits, to the in-vehicle router 10, information on the access point AP at the periphery of the position of the vehicle 2. In a case where the external CPU 23 has received information also including a traveling direction of the vehicle 2 from the in-vehicle router 10, the external CPU 23 transmits, to the in-vehicle router 10, information on the access point AP at the periphery of the position of the vehicle 2 based on the position and traveling direction of the vehicle 2. Thus, a used capacity of the in-vehicle memory 15 of the in-vehicle router 10 can be reduced. Alternatively, the external CPU 23 may transmit, to the in-vehicle router 10, information on all access points AP included in the AP table TB2 according to the request from the in-vehicle router 10. The in-vehicle router 10 stores, in the in-vehicle memory 15, information on the access point AP transmitted from the external CPU 23 via the communicator 21. The in-vehicle router 10 determines the access point AP to be subsequently connected among the access points AP stored in the in-vehicle memory 15. At this point, the in-vehicle router 10 may increase the degree of priority of the access point AP with a relatively-low usage rate. Thus, the in-vehicle router 10 can avoid, to the extent possible, the access point AP at which communication is congested, and can implement connection ensuring a certain level of communication speed.

In a case where the external CPU 23 has received the information including the position of the vehicle 2 from the in-vehicle router 10, the external CPU 23 may provide service information regarding a restaurant, for example. For example, the external CPU 23 may transmit, to the in-vehicle router 10, unoccupied table information on a restaurant at the periphery of the position of the vehicle 2 or information including a discount coupon according to an unoccupied table of a restaurant, for example. Note that as illustrated in FIG. 11, the external device 20 may be connected to each access point AP to form an access point management system 100. In this case, in the access point management system 100, the external device 20 grasps the position of each access point AP, and therefore, the service information based on the position of each access point AP can be provided. For example, the external device 20 transits, to the in-vehicle router 10 connected to an first access point AP1, unoccupied table information on a restaurant at the periphery of the first access point AP1 or information including a discount coupon according to an unoccupied table of a restaurant.

As described above, the vehicle communication system 1C according to the second embodiment includes the external device 20 provided as the device provided outside the vehicle 2 and including the external memory 22 storing the access points AP. The external device 20 transmits the access points AP stored in the external memory 22 to the in-vehicle CPU 16, and the in-vehicle CPU 16 determines the access point AP to be subsequently connected among the access points AP transmitted from the external device 20. For example, in a case where the vehicle communication system 1C has received the information including the position of the vehicle 2 from the in-vehicle router 10, the vehicle communication system 1C transmits, to the in-vehicle router 10, the information on the access point AP at the periphery of the position of the vehicle 2. With this configuration, the vehicle communication system 1C can reduce the amount of information on the access point AP in the in-vehicle memory 15, and can reduce the used capacity of the in-vehicle memory 15.

Note that the vehicle communication system 1C may select the subsequent access point AP by the external device 20. In this case, the in-vehicle CPU 16 transmits vehicle position information and vehicle speed information to the external CPU 23. Based on the vehicle position information and the vehicle speed information transmitted from the in-vehicle CPU 16, the external CPU 23 selects a candidate access point AP as a candidate for subsequent connection from the access points AP of the AP table TB2 stored in the external memory 22, thereby transmitting the candidate access point AP to the in-vehicle CPU 16. The in-vehicle CPU 16 determines, as the access point AP to be subsequently connected, the candidate access point AP transmitted from the external CPU 23. With this configuration, the vehicle communication system 1C selects the candidate access point AP by the external CPU 23, and therefore, a load on the in-vehicle CPU 16 can be reduced.

Alternatively, the vehicle communication system 1C may determine the access point AP to be connected to the Wi-Fi module 12a based not only on the vehicle position information and the vehicle speed information but also on power information. In this case, the Wi-Fi module 12a can acquire the power information indicating that the reception intensity of a radio wave received from the access point AP. Further, the in-vehicle CPU 16 transmits the power information to the external CPU 23. Based on the vehicle position information, the vehicle speed information, and the power information transmitted from the in-vehicle CPU 16, the external CPU 23 transmits, to the in-vehicle CPU 16, the candidate access point AP as the candidate for subsequent connection among the access points AP stored in the external memory 22. With this configuration, the vehicle communication system 1C can be connected to the access point AP with relatively-high reception intensity, and therefore, connectivity to the access point AP can be improved.

The external device 20 may be cloud computing for providing computer resources such as various types of software and multiple types of hardware.

The example where the vehicle communication system 1, 1A, 1B, 1C acquires the vehicle position information indicating the position of the vehicle 2 by the GPS 13 has been described, but the present invention is not limited to above. The vehicle position information may be acquired by other methods.

Moreover, the vehicle communication system 1, 1A, 1B, 1C may cooperate with a car navigation system configured to guide a path to a destination, and may register an access point AP on the path to the destination in the in-vehicle memory 15. Thus, the capacity of the in-vehicle memory 15 can be reduced in the vehicle communication system 1. Alternatively, the vehicle communication system 1, 1A, 1B, 1C may notify, in advance, an available access point AP at a destination.

The vehicle communication system according to the present embodiment determines the access point to be connected to the communication module based on the vehicle position information and the vehicle speed information. This can suppress, in a vehicle traveling state, the vehicle communication system from passing by a connectable region of the access point during authorization for the access point, and therefore, proper connection to the access point can be made.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle communication system comprising:
   a communication module mounted on a vehicle and selectively connectable to any one of a plurality of access points of a wireless local area network;
   a position acquirer configured to acquire vehicle position information indicating a position of the vehicle;
   a vehicle speed acquirer configured to acquire vehicle speed information indicating a speed of the vehicle; and
   an in-vehicle controller configured to determine the access point to be connected to the communication module based on the vehicle position information and the vehicle speed information, wherein
   the communication module receives data from each of the access points that is indicative of a respective total number of connections for each access point,
   the in-vehicle controller
      determines a usage rate for each of the access points, in which the usage rate is based on the respective total number of connections for each access point,
      determines, as a subsequent connection destination, a first access point where the usage rate of the first access point is lowest among the usage rates of the access points in a case where the speed in the vehicle speed information indicates a first speed, and
      determines, as another subsequent connection destination, a second access point farther from the vehicle than the first access point and where the usage rate of the second access point is lowest among the usage rates of the access points in a case where the speed in the vehicle speed information indicates a second speed faster than the first speed.

2. The vehicle communication system according to claim 1, further comprising:
   an in-vehicle storage mounted on the vehicle to store the access points, wherein
   the in-vehicle controller determines the access point to be subsequently connected among the access points stored in the in-vehicle storage.

3. The vehicle communication system according to claim 2, further comprising:
   an external device provided outside the vehicle and including an external storage storing the access points, wherein
   the external device transmits the access points stored in the external storage to the in-vehicle controller, and
   the in-vehicle controller determines the access point to be subsequently connected among the access points transmitted from the external device.

4. The vehicle communication system according to claim 2, further comprising:
   the external device provided as the device provided outside the vehicle and including the external storage storing the access points and an external controller configured to select the access point as a candidate, wherein the in-vehicle controller transmits the vehicle position information and the vehicle speed information to the external controller, based on the vehicle position information and the vehicle speed information transmitted from the in-vehicle controller, the external controller transmits, to the in-vehicle controller, a candidate access point as a candidate for subsequent connection among the access points stored in the external storage, and the in-vehicle controller determines, as the access point to be subsequently connected, the candidate access point transmitted from the external controller.

5. The vehicle communication system according to claim 1, further comprising:
an external device provided outside the vehicle and including an external storage storing the access points, wherein
the external device transmits the access points stored in the external storage to the in-vehicle controller, and
the in-vehicle controller determines the access point to be subsequently connected among the access points transmitted from the external device.

6. The vehicle communication system according to claim 5, further comprising:
the external device provided as the device provided outside the vehicle and including the external storage storing the access points and an external controller configured to select the access point as a candidate, wherein
the in-vehicle controller transmits the vehicle position information and the vehicle speed information to the external controller,
based on the vehicle position information and the vehicle speed information transmitted from the in-vehicle controller, the external controller transmits, to the in-vehicle controller, a candidate access point as a candidate for subsequent connection among the access points stored in the external storage, and
the in-vehicle controller determines, as the access point to be subsequently connected, the candidate access point transmitted from the external controller.

7. The vehicle communication system according to claim 1, further comprising:
the external device provided as the device provided outside the vehicle and including the external storage storing the access points and an external controller configured to select the access point as a candidate, wherein
the in-vehicle controller transmits the vehicle position information and the vehicle speed information to the external controller,
based on the vehicle position information and the vehicle speed information transmitted from the in-vehicle controller, the external controller transmits, to the in-vehicle controller, a candidate access point as a candidate for subsequent connection among the access points stored in the external storage, and
the in-vehicle controller determines, as the access point to be subsequently connected, the candidate access point transmitted from the external controller.

8. The vehicle communication system according to claim 7, wherein
the communication module is able to acquire the power information indicating the reception intensity of the radio wave received from the access point,
the in-vehicle controller further transmits the power information to the external controller, and
based on the vehicle position information, the vehicle speed information, and the power information transmitted from the in-vehicle controller, the external controller transmits, to the in-vehicle controller, the candidate access point as the candidate for subsequent connection among the access points stored in the external storage.

9. A vehicle communication system comprising:
a communication module mounted on a vehicle and connectable to an access point of a wireless local area network;
a position acquirer configured to acquire vehicle position information indicating a position of the vehicle;
a vehicle speed acquirer configured to acquire vehicle speed information indicating a speed of the vehicle; and
an in-vehicle controller configured to determine the access point to be connected to the communication module based on the vehicle position information and the vehicle speed information, wherein
the communication module is able to acquire power information indicating a reception intensity of a radio wave received from the access point,
the in-vehicle controller determines the access point to be connected to the communication module based on the vehicle position information, the vehicle speed information, and the power information, and
the in-vehicle controller
determines, as a subsequent connection destination, a first access point greatest in power in the power information among multiple access points in a case where the speed in the vehicle speed information indicates a first speed, and
determines, as another subsequent connection destination, a second access point assumed farther from the vehicle than the first access point is and greatest in the power in the power information upon connection among the multiple access points in a case where the speed in the vehicle speed information indicates a second speed faster than the first speed.

10. The vehicle communication system according to claim 9, further comprising:
an in-vehicle storage mounted on the vehicle to store the access points, wherein
the in-vehicle controller determines the access point to be subsequently connected among the access points stored in the in-vehicle storage.

11. The vehicle communication system according to claim 9, further comprising:
an external device provided outside the vehicle and including an external storage storing the access points, wherein
the external device transmits the access points stored in the external storage to the in-vehicle controller, and
the in-vehicle controller determines the access point to be subsequently connected among the access points transmitted from the external device.

12. The vehicle communication system according to claim 9, further comprising:
the external device provided as the device provided outside the vehicle and including the external storage storing the access points and an external controller configured to select the access point as a candidate, wherein
the in-vehicle controller transmits the vehicle position information and the vehicle speed information to the external controller, based on the vehicle position information and the vehicle speed information transmitted from the in-vehicle controller, the external controller transmits, to the in-vehicle controller, a candidate access point as a candidate for subsequent connection among the access points stored in the external storage, and the in-vehicle controller determines, as the access point to be subsequently connected, the candidate access point transmitted from the external controller.

\* \* \* \* \*